United States Patent
Yamada

(10) Patent No.: US 6,730,896 B1
(45) Date of Patent: May 4, 2004

(54) OPTICAL PICKUP DEVICE

(75) Inventor: Eiji Yamada, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/577,905

(22) Filed: May 24, 2000

(30) Foreign Application Priority Data

May 24, 1999 (JP) .......................................... 11-143954

(51) Int. Cl.[7] ................................................ G02B 9/00
(52) U.S. Cl. .................... 250/201.5; 250/216; 359/717; 369/112.01
(58) Field of Search .............................. 250/201.5, 216; 359/717, 719; 369/43, 44.32, 112.01, 112.24

(56) References Cited

U.S. PATENT DOCUMENTS

| | | | |
|---|---|---|---|
| 6,594,091 B2 | * | 7/2003 | Maeda et al. ................ 359/719 |
| 2001/0021145 A1 | * | 9/2001 | Ichimura et al. .............. 369/43 |
| 2003/0081530 A1 | * | 5/2003 | Sato et al. ............. 369/112.24 |

FOREIGN PATENT DOCUMENTS

JP    BA 8-212579    8/1996

* cited by examiner

Primary Examiner—Stephone B. Allen
(74) Attorney, Agent, or Firm—Edwards & Angell; David G. Conlin

(57) ABSTRACT

In an optical pickup device, an objective lens unit includes a first lens, a second lens for converging a light beam which passed through the first lens on an information recording layer of a recording medium, and a second-lens-driving-use actuator for adjusting the distance between the first and second lenses. The second lens has a reflecting section for reflecting an outer part of the light beam which passed through the first lens and reached the second lens. Moreover, the optical pickup device includes a condenser lens, a cylindrical lens and a light receiving element for detecting a reflected light beam reflected by the reflecting section, and a control device for detecting the distance between the first and second lenses according to the result of detection and for controlling the second-lens-driving-use actuator according to the result of detection. With this structure, the occurrence of spherical aberration due to an error in the thickness of a cover glass of the recording medium and variations in the thickness of the objective lens is limited.

13 Claims, 12 Drawing Sheets

FIG.12
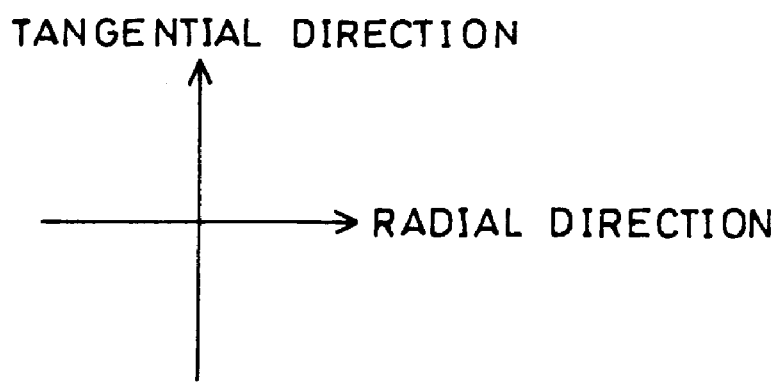
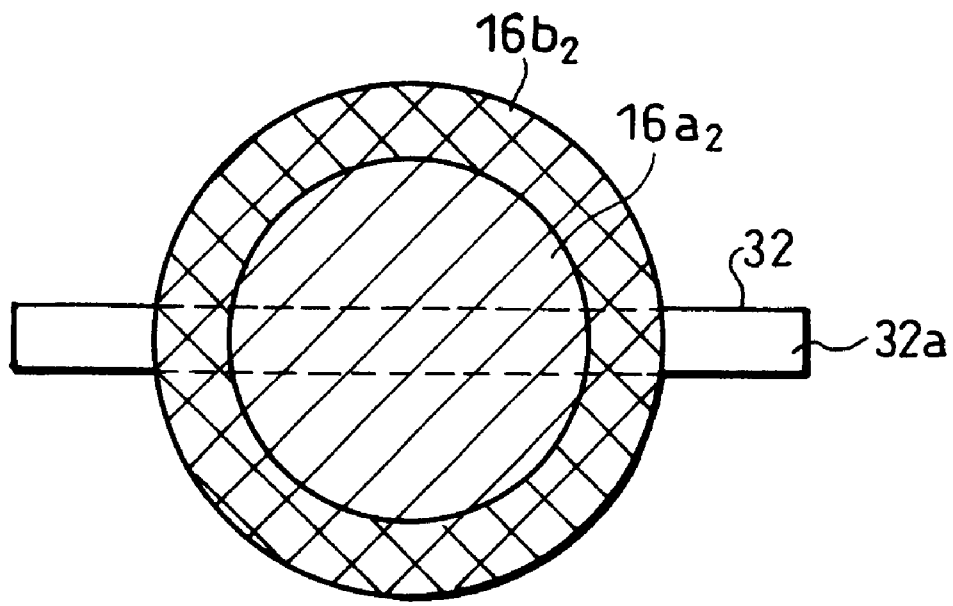

OPTICAL PICKUP DEVICE

FIELD OF THE INVENTION

The present invention relates to an optical pickup device which records or reproduces information on a recording medium by converging a light beam onto the recording medium.

BACKGROUND OF THE INVENTION

It is desirable that an objective lens of an optical pickup device converges a light beam onto an information recording layer of a recording medium without aberration. Moreover, a decrease of the beam diameter of the light beam converged onto the information recording layer can increase the recording density of the recording medium and hence the recording capacity of the recording medium is increased.

One example of a method of decreasing the light beam increases the numerical aperture (NA). In a prior art, for example, the numerical aperture is 0.45 for a CD (compact disk) and 0.6 for a DVD (digital versatile disk. In recent years, the beam diameter is decreased by further increasing the numerical aperture.

However, for example, if the numerical aperture is increased to 0.85, it is difficult to form an objective lens by a single lens. Namely, the higher the numerical aperture, the more limited fabrication tolerance and assembling tolerance of the lens. Consequently, the objective lens formed by a single lens has difficulty in limiting the aberration within the tolerance and can not decrease the beam diameter.

Hence, if an objective lens and a spherical lens are combined to form an objective lens by two pieces of lenses, the fabrication tolerance and assembling tolerance of the lens are increased, thereby achieving a high numerical aperture.

Meanwhile, for the recording medium, the information recording layer is covered with a cover glass to provide protection against dust and scratches. More specifically, a light beam emitted from the objective lens passes through the cover glass, and converges on the information recording layer located under the cover glass and is hence focused. At this time, the beam diameter is minimized. However, if the thickness of the cover glass is not a predetermined value, the spherical aberration (SA) occurs and the beam diameter is increased. In this case, information can not be correctly read or written with respect to the information recording layer.

Moreover, the spherical aberration is proportional to the thickness error $\Delta d$ in the cover glass and the fourth power of the numerical aperture NA.

$$SA \propto \Delta d \cdot NA^4 \qquad (1)$$

Therefore, even when the thickness error $\Delta d$ is the same, the spherical aberration SA is increased with an increase of the numerical aperture NA. For instance, when the numerical aperture is 0.85, the spherical aberration SA is about four times larger than a spherical aberration when the numerical aperture is 0.6. Thus, as in the case of a numerical aperture of 0.85, when the numerical aperture is high, it is necessary to compensate for the spherical aberration caused by the thickness error in the cover glass.

On the other hand, Japanese laid-open publication (Tokukaihei) No. 8-212579 (published on Aug. 20, 1996) proposes a method of limiting an increase of the beam diameter by cancelling the spherical aberration caused by the thickness error in the cover glass and variations in the thickness of the objective lens.

In a conventional technique disclosed in the above publication, an objective lens unit 51 shown in FIG. 13 is provided. This objective lens unit 51 includes a first lens 52 and a second lens 53. The first lens 52 is held by a first holder 54. The second lens 53 is hemispherical and held by a second holder 55. Incidentally, the first holder 54 and the second holder 55 form a capacitor. Moreover, a cover glass 56b is provided on a side facing the objective lens unit 51 of a recording medium 56, and an information recording layer 56a is provided on the other side of the recording medium 56. Besides, a light beam 57 passed through the objective lens unit 51 is made to converge onto the information recording layer 56a.

The electrostatic capacity C of the capacitor is given by $$C \propto S/d \qquad (2)$$

wherein S is the area where the first holder 54 and the second holder 55 face each other and d is the distance between the first holder 54 and the second holder 55.

Thus, it is possible to control the distance d between the first holder 54 and the second holder 55 by detecting the electrostatic capacity C.

Moreover, in order to prevent a crash of the recording medium 56 and the objective lens unit 51 during a rotation of the recording medium 56, it is necessary to provide a work distance WD between the recording medium 56 and the objective lens unit 51. As shown in the paper "High-numerical-aperture lens system for optical storage, Optics Letters, Vol. 18, No. 4, pp. 305–307, (1993)", the spherical aberration SA caused by this work distance WD is given by $$SA = -(WD/8) \cdot n^2(n^2-1)\sin^4\theta_0 \qquad (3)$$

wherein n is the refractive index of the second lens 53 and $\sin\theta_0$ is the numerical aperture NA of the first lens 52.

The objective lens unit 51 formed by the first lens 52 and the second lens 53 is optically designed to eliminate the above-mentioned spherical aberration for a certain work distance WD. When a displacement from the above work distance WD is referred to as $\Delta WD$, a spherical aberration SA1 caused by this work distance $\Delta WD$ is given by $$SA1 = -(\Delta WD/8) \cdot n^2(n^2-1)\sin^4\theta_0 \qquad (4)$$

according to equation (3).

Besides, as shown in the above-mentioned paper, a spherical aberration SA2 caused by the thickness error $\Delta d$ in the cover glass 56b is given by $$SA2 = (\Delta d)^2/(8a)n(n-1)\sin^4\theta_0 \qquad (5)$$

wherein a is the radius of curvature of the spherical surface of the second lens 53.

Therefore, even if there are a thickness error $\Delta d$ in the cover glass 56b and variations in the thickness of the objective lens unit 51, it is possible to cancel the occurrence of spherical aberration by cancelling out the spherical aberrations SA1 and SA2. In other words, the work distance WD needs to be controlled to an optimum value by changing the work distance WD according to the thickness error $\Delta d$ in the cover glass 56b and the variations in the thickness of the objective lens unit 51.

In the above-mentioned conventional structure shown in FIG. 13, the distance between the first lens 52 and the recording medium 56 is adjusted to be uniform by a focusing operation. Furthermore, the distance between the first lens 52 and the second lens 53 is controlled to an optimum value by detecting the electrostatic capacity between the first holder 54 and the second holder 55. As a result, the work distance WD between the second holder 55 and the recording medium 56 is controlled to an optimum value. Consequently, even if there are a thickness error Δd in the cover glass 56b and variations in the thickness of the objective lens unit 51, it is possible to limit the occurrence of spherical aberration.

However, in the above-mentioned conventional structure, in order to detect the electrostatic capacity C of the capacitor formed by the first holder 54 and the second holder 55, it is necessary to lead conductors out of the first holder 54 and the second holder 55, respectively. On the other hand, in general, a focusing operation and a tracking operation for displacing the objective lens in the optical axis direction and a direction perpendicular to the optical axis are performed in an optical pickup. Therefore, the conductors viciously affect the performance of the focusing operation and the tracking operation of the objective lens unit 51. Namely, deterioration of the frequency characteristics and a tilt of the optical lens unit 51 occur. Moreover, since the conductors are long, a phase lag occurs in detecting the electrostatic capacity C due to the inductance of the conductors, etc., causing a problem that the frequency band for the detection can not be increased.

SUMMARY OF THE INVENTION

In order to solve the above problems, it is an object of the present invention to provide an optical pickup device capable of detecting the distance between lenses constituting an objective lens unit with high accuracy up to a high band and performing recording or reproduction of information on a recording medium accurately irrespective of an error in the thickness of the cover glass of the recording medium and variations in the thickness of the objective lens unit.

In order to achieve the above object, an optical pickup device of the present invention includes:

an objective lens unit including a first lens, a second lens for converging a light beam which passed through the first lens on a recording surface of a recording medium, and a lens distance adjusting section for adjusting the distance between the first lens and the second lens, wherein the second lens has a reflecting section for reflecting an outer part of the light beam which passed through the first lens and reached the second lens;
    a reflected light beam detecting section for detecting a reflected light beam reflected by the reflecting section of the second lens; and
  a control section for detecting the distance between the first lens and the second lens according to a result of detection by the reflected light beam detecting section and for controlling the lens distance adjusting section according to the result of detection.

According to this structure, the light beam incident on the objective lens unit passes through the first lens and reaches the second lens. The outer part of this light is reflected by the reflecting section of the second lens, while the center part of the light is made to converge on the recording surface of the recording medium by the second lens. Thus, writing or reading of information on the recording surface of the recording medium is performed by the center part of the light.

Meanwhile, the reflected light beam reflected by the reflecting section is emitted from the objective lens unit after passing through the first lens, and detected by the reflected light beam detecting section. The control section first detects the distance between the first lens and second lens of the objective lens unit according to the result of detection by the reflected light beam detecting section. Next, the control section controls the lens distance adjusting section according to the above result of detection.

Hence, according to this structure, since the distance between the first lens and the second lens is detected on the basis of the reflected light beam which passed through the first lens of the objective lens unit and was reflected by the second lens, there is no need to use conductors which are provided in a structure in which the distance between the lenses is detected on the basis of the electrostatic capacity between a holder for the first lens and a holder for the second lens. It is therefore possible to prevent the conductors from affecting the performance of the focusing operation and tracking operation of the objective lens unit and avoid a situation where the frequency band in detecting the distance between the lenses can not be increased.

Consequently, the distance between the lenses constituting the objective lens unit can be detected with high accuracy up to a high frequency band, and recording or reproduction of information on the recording medium can be performed accurately irrespective of an error in the thickness of the cover glass of the recording medium and variations in the thickness of the objective lens unit.

For a fuller understanding of the nature and advantages of the invention, reference should be made to the ensuing detailed description taken in conjunction with the accompanying drawings.

BRIEF DESCRIPTION OF THE DRAWINGS

FIG. 12 is a front view showing the detection state of the reflected light beam from the reflecting film of the second lens by a light receiving element which is another example of the light receiving element shown in FIG. 11.

DESCRIPTION OF THE PREFERRED EMBODIMENTS

Embodiment 1

The following description will explain one embodiment of the present invention with reference to FIG. 1 through FIG. 9.

Figure 1:
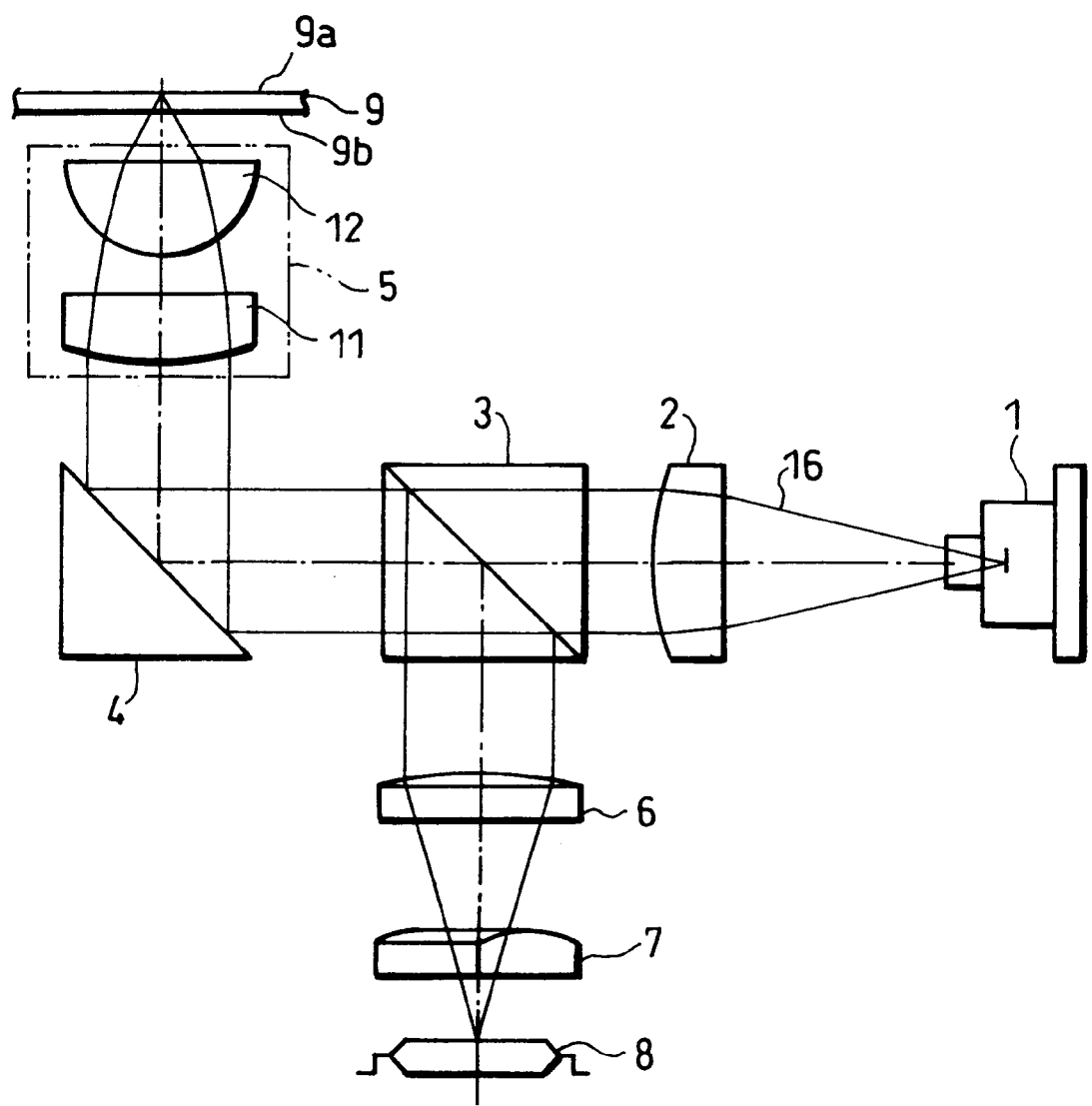
FIG. 1 is a view showing schematically an entire structure of an optical pickup according to an embodiment of the present invention.

An optical pickup device according to this embodiment has the structure shown in FIG. 1. This optical pickup device includes a hologram laser unit 1, a collimator 2, a polarizing beam splitter 3, a veering mirror 4, an objective lens unit 5, a condenser lens (reflected light beam detecting means) 6, a cylindrical lens (reflected light beam detecting means) 7, and a light receiving element 8.

A light beam 16 emitted by the hologram laser unit 1 passes through the collimator 2 and polarizing beam splitter 3, is veered toward the objective lens unit 5 by the veering mirror 4, and falls on the objective lens unit 5. The light beam 16 incident on the objective lens unit 5 passes through a first lens 11 and a second lens 12 in this order, and then converges on an information recording layer 9a of a recording medium 9 without aberration.

Incidentally, as described later, the light beam 16 converged on the information recording layer 9a is only part of the light beam 16 which passes through the central part of the second lens 12, and part of the light beam 16 which passes through the outer part is reflected by the second lens 12. Besides, the recording medium 9 includes a cover glass 9b on a side facing the objective lens unit 5, and an information recording layer 9a on the other side.

After the light beam 16 is reflected by the information recording layer 9a of the recording medium, it falls on the objective lens unit 5 again, passes through the second lens 12 and the first lens 11 in this order, and is then emitted as a parallel light beam from the objective lens unit 5. This parallel light passes through the veering mirror 4, the polarizing beam splitter 3 and the collimator 2 successively, enters into the hologram laser unit 1 and is converted into, for examples, reproduced signals.

Furthermore, part of the light beam 16 which falls on the polarizing beam splitter 3 after passing through the objective lens unit 5 and the veering mirror 4 is made to converge on the light receiving surface of the light receiving element 8 through the condenser lens 6 and the cylindrical lens 7. As described later, a detection system formed by these condenser lens 6, cylindrical lens 7 and light receiving element 8 is used for detecting the distance between the first lens 11 and the second lens 12 by an astigmatic method.

In the optical pickup device, a focusing operation and a tracking operation are performed by displacing the objective lens unit 5 in the optical axis direction and a direction perpendicular to the optical axis. The focusing operation is an operation for bringing a focal point to which the light beam converges on the information recording layer 9a of the recording medium 9. Besides, the tracking operation is an operation for bringing the focal point to which the light beam converges on a track formed on the recording medium 9. More specifically, the focusing operation is an operation for displacing the objective lens unit 5 in a direction normal to the recording medium 9, i.e., in the optical axis direction, and the tracking operation is an operation for displacing the objective lens unit 5 in a radial direction of the recording medium 9.

The veering mirror 4 is provided to achieve a thin optical pickup device. Thus, in terms of the function of the optical pickup device, the veering mirror 4 is not particularly necessary. Incidentally, like the above-mentioned veering mirror 4, an optical system of the optical pickup device according to this embodiment uses a hologram laser unit 1, i.e., a unit including a laser light source and a signal detecting section for a focusing signal, tracking signal and recorded information signal as a single component, to achieve a thin and small optical pickup device. However, it is possible to use an ordinary optical system including a light source and a signal detecting section as separate components.

Figure 2:
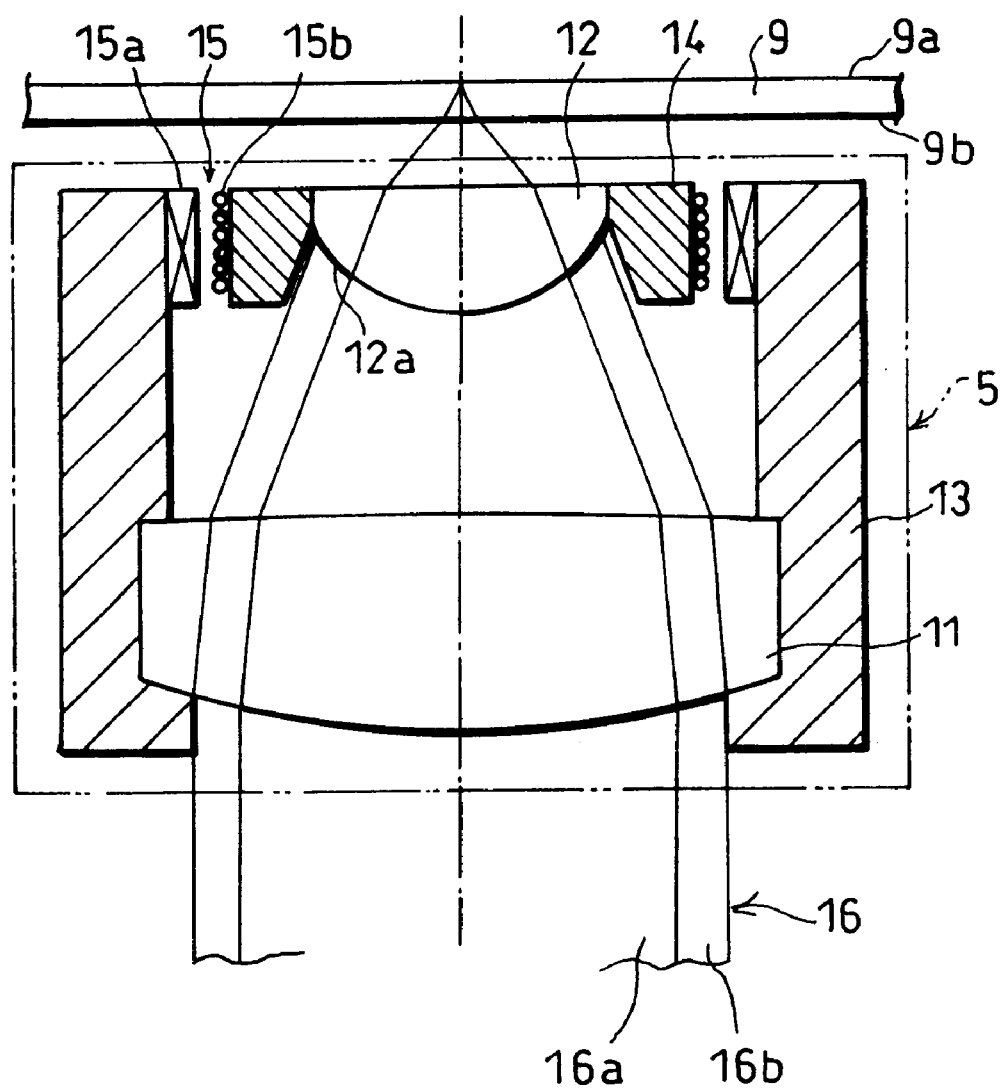
FIG. 2 is an enlarged cross sectional view of an objective lens unit shown in FIG. 1.

As illustrated in FIG. 2, the objective lens unit 5 includes the first lens 11, the second lens 12, the first holder 13, the second holder 14, and a second-lens-driving-use actuator (lens distance adjusting means) 15.

The first holder 13 has, for example, a cylindrical shape, and holds the first lens 11 therein. The second holder 14, has, for example, a ring shape, and holds the second lens 12 in the center thereof. Additionally, the second holder 14 is supported movably in the optical axis direction in the first holder 13, and the second lens 12 is positioned on the recording medium 9 side of the first lens 11.

The second-lens-driving-use actuator 15 is provided between the first holder 13 and the second holder 14. This second-lens-driving-use actuator 15 is formed by a magnet 15a provided on the inner surface of the first holder 13 and a coil 15b provided on the outer surface of the second holder 14. With this structure, the second-lens-driving-use actuator 15 moves the second lens 12 in the optical axis direction. With the movement of the second lens 12, the distance between the first lens 11 and the second lens 12 can be adjusted.

Besides, a focusing-operation-use actuator and a tracking-operation-use actuator (not shown) are provided on the periphery of the first holder 13. The objective lens unit 5 is driven by these actuators to perform the tracking operation and focusing operation.

Figure 3:
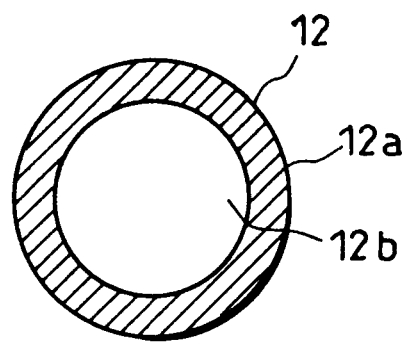
FIG. 3 is a front view of the second lens of the objective lens unit shown in FIG. 1.

The second lens 12 has a hemispherical shape, and is positioned so that its flat surface faces the recording medium 9 and its spherical surface faces the first lens 11. As illustrated in FIG. 3, a ring-shaped reflecting film (reflecting section) 12a is formed at the outer part of the spherical surface of the second lens 12. Therefore, an inner part of the second lens 12 located inside of the reflecting film 12a serves as a light transmitting section 12b. The diameter of this light transmitting section 12b is determined by the numerical aperture NA of the objective lens unit 5.

With this structure, as illustrated in FIG. 2, a center light beam 16a of the light beam 16 incident on the second lens 12 from the first lens 11 side passes through the second lens 12, but an outer light beam 16b of the light beam 16 is reflected by the reflecting film 12a.

The reflecting film 12a is formed by, for example, vapor deposition of a metal film. With the formation of the reflecting film 12a, the reflectance of the light incident on the outer part of the second lens 12 is increased and hence a later-described detection of the lens distance by the reflected light can be performed accurately.

Figure 5A:
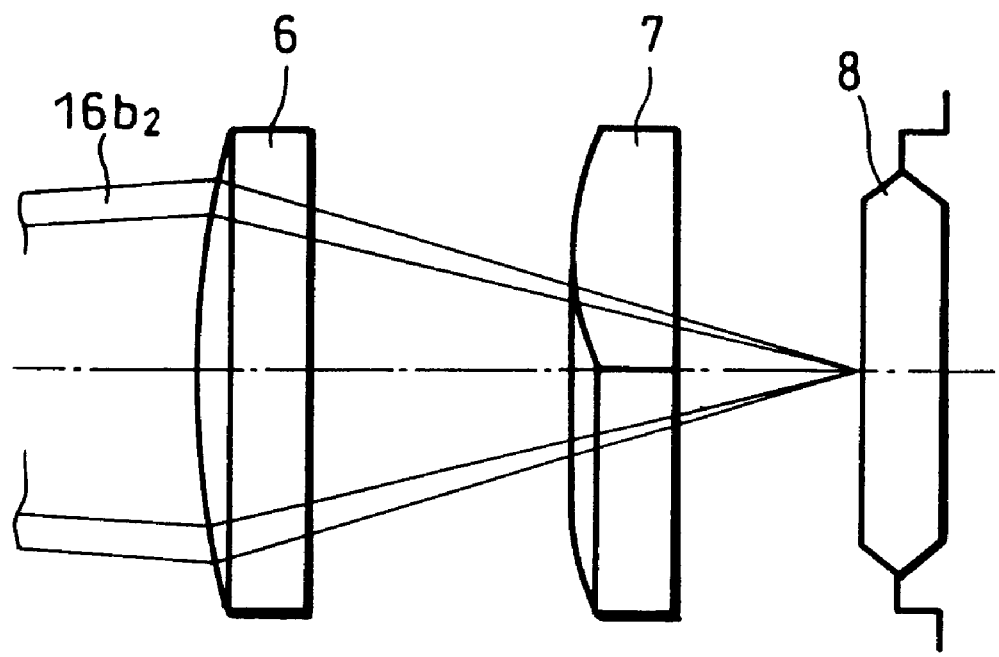
FIG. 5(a) is an explanatory view of an optical system for detecting the lens distance between the first lens and the second lens of the objective lens shown in FIG. 1 when the focal point of a reflected light beam from a reflecting film of the second lens is present on a light receiving surface of a light receiving element.
Figure 5B:
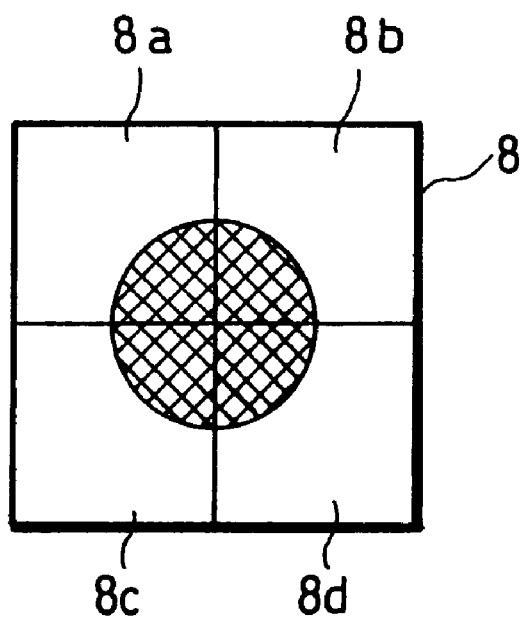
FIG. 5(b) is a front view showing the shape of a beam spot on the light receiving element in the state shown in FIG. 5(a).

The light receiving element 8 is formed by, for example, a photodiode, and includes four quadrant light receiving surfaces 8a, 8b, 8c and 8d as shown in FIG. 5(b). The reflected light of the light beam 16 reflected from the reflecting film 12a of the second lens 12 is designed to fall on the center of the light receiving surfaces 8a to 8d of the light receiving element 8. The shape of the beam spot of the reflected light on the light receiving element 8 varies according to the distance between the first lens 11 and second lens 12 of the objective lens unit 5. This variation is caused by an astigmatic effect produced by the cylindrical lens 7 which is positioned so that it tilts at an angle of 45 degrees on the optical axis with respect to the light receiving element 8.

Figure 4:
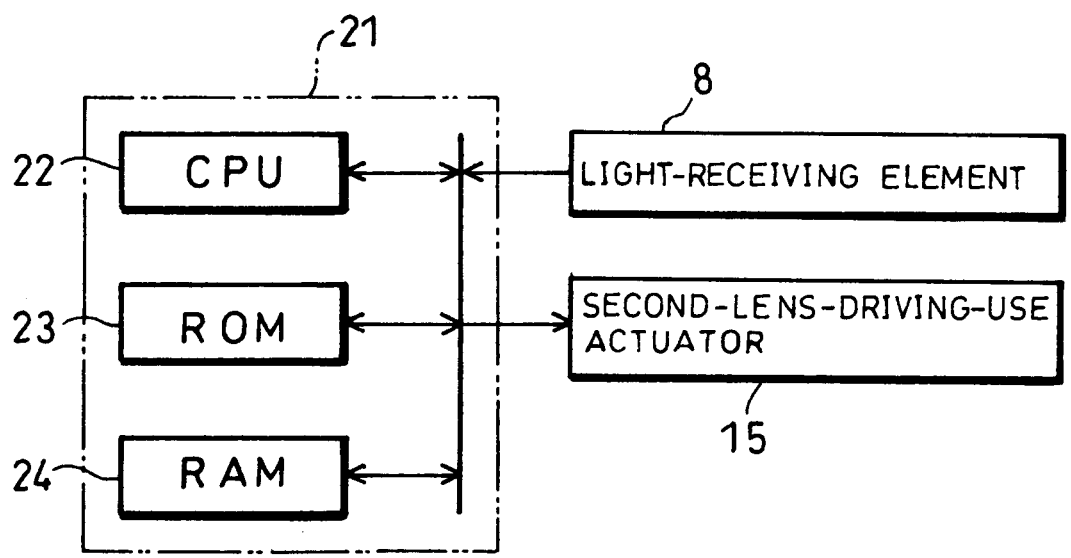
FIG. 4 is a block diagram of a control device included in the optical pickup shown in FIG. 1.

As illustrated in FIG. 4, the optical pickup device includes the second-lens-driving-use actuator 15, i.e., a control device (control means) 21 for controlling the distance between the first lens 11 and the second lens 12 according to a detection signal of the light receiving element (control means) 8. This control device 21 includes a CPU 22, a ROM 23 for storing a control program for the CPU 22, and a RAM 24 serving as the memory area for the work of the CPU 22.

With this structure, as shown in FIG. 2, the center light beam 16a of the light beam 16 incident on the objective lens unit 5 passes through the first lens 11 and the second lens 12 successively and is made to converge on the information recording layer 9a of the recording medium 9 as described above.

On the other hand, the outer light beam 16b of the light beam 16 reflected by the reflecting film 12a of the second lens 12 after passing through the first lens 11, passes through the first lens 11 again and is then emitted from the objective lens unit 5. This light beam 16b will be hereinafter referred to as the reflected light beam $16b_2$. The reflected light beam $16b_2$ falls on the light receiving element 8 through the veering mirror 4, polarizing beam splitter 3, condenser lens 6 and cylindrical lens 7 shown in FIG. 1. As described later, it is desirable that the reflected light beam $16b_2$ is non-parallel light, i.e., convergent light or divergent light.

Here, when the distance between the first lens 11 and the second lens 12 varies, the radius r of curvature of the wave front of the reflected light beam $16b_2$ immediately after being emitted from the objective lens unit 5 toward the veering mirror 4 varies. The radius r of curvature is detected by a structure composed of the condenser lens 6, the cylindrical lens 7 and the light receiving element 8. Therefore, the distance between the first lens 11 and second lens 12, i.e., the lens distance, which interacts with the radius r of curvature can be measured by the output signals of the light receiving element 8. According to the result of the measurement, the control device 21 can control the second-lens-driving-use actuator 15 so as to achieve an optimum lens distance.

Next, the following description will explain the theory of measurement of the lens distance.

When the light beam $16b_2$ is focused on the four quadrant light receiving surfaces 8a to 8d of the light receiving element 8 as shown in FIG. 5(a), it forms a circular beam spot on the light receiving surfaces 8a to 8d.

Figure 6A:
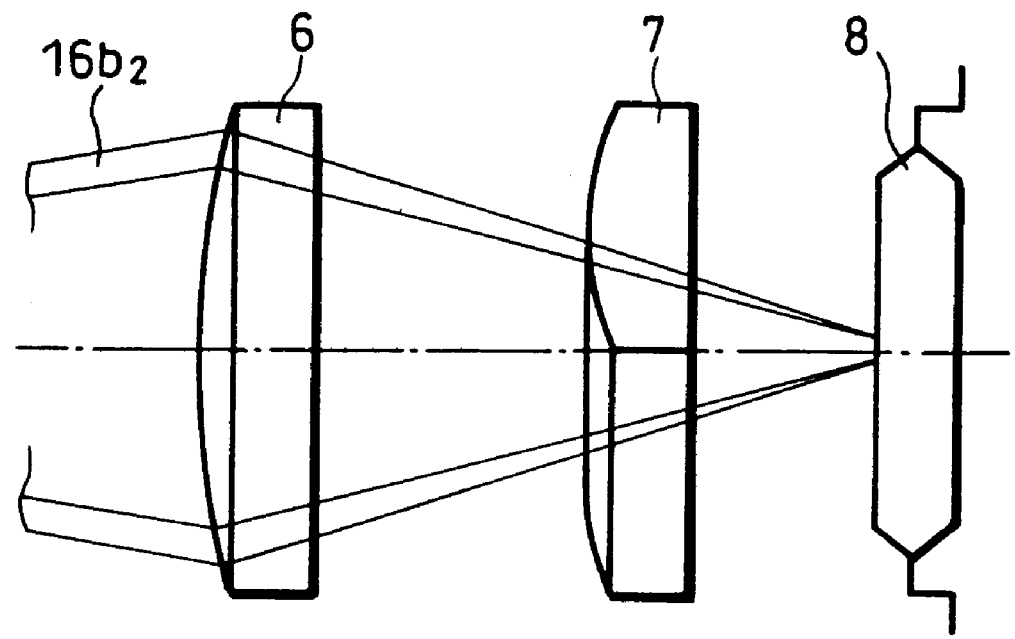
FIG. 6(a) is an explanatory view of the optical system when the focal point of the reflected light beam is present in a position further than the light receiving surface of the light receiving element.
Figure 6B:
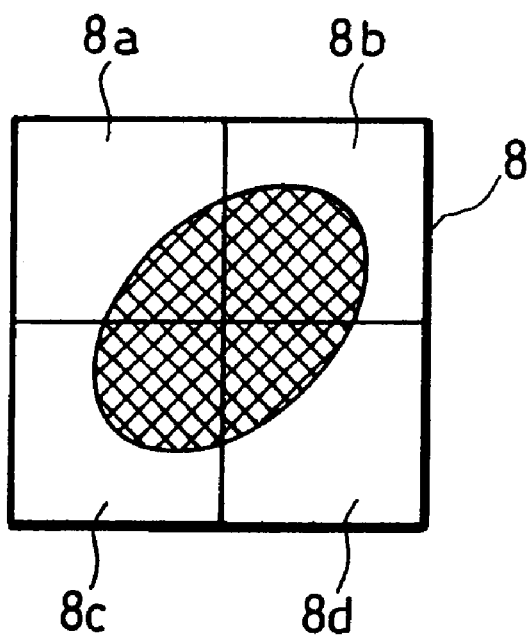
FIG. 6(b) is a front view showing the shape of a beam spot in the state shown in FIG. 6(a).

Incidentally, when the degree of divergence of the reflected light beam $16b_2$ is larger compared with the case shown in FIG. 5(a), the focal point of the reflected light beam $16b_2$ is located at a position further from the cylindrical lens 7 than the light receiving surfaces 8a to 8d. In this case, the shape of the beam spot of the reflected light beam $16b_2$ is oval elongated in the directions of 8b and 8c as shown in FIG. 6(b).

Figure 7A:
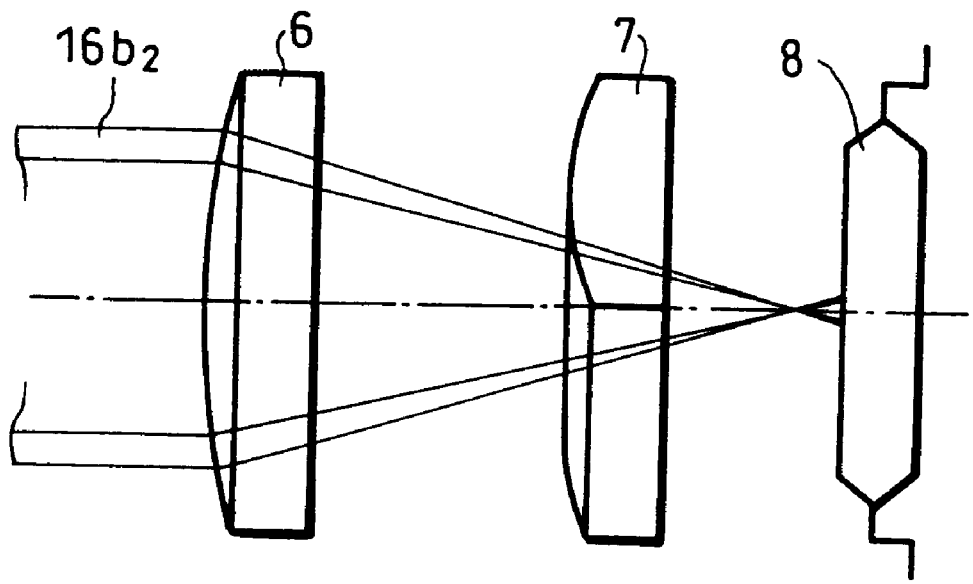
FIG. 7(a) is an explanatory view of the optical system when the focal point of the reflected light beam is present in a position nearer than the light receiving surface of the light receiving element.
Figure 7B:
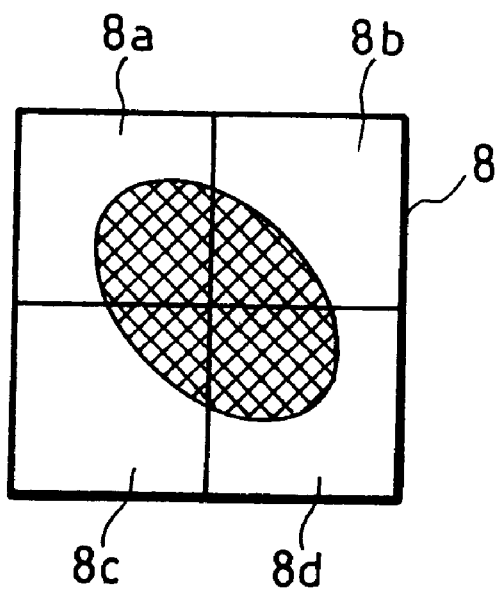
FIG. 7(b) is a front view showing the shape of a beam spot in the state shown in FIG. 7(a).

On the other hand, when the degree of divergence of the reflected light beam $16b_2$ is smaller compared with the case shown in FIG. 5(a), the focal point of the reflected light beam $16b_2$ is located at a position nearer to the cylindrical lens 7 than the light receiving surfaces 8a to 8d as shown in FIG. 7(a). In this case, the shape of the beam spot of the reflected light beam $16b_2$ is oval elongated in the directions of 8a and 8d as shown in FIG. 7(b) in contrast to the case shown in FIG. 6(b).

Figure 8:
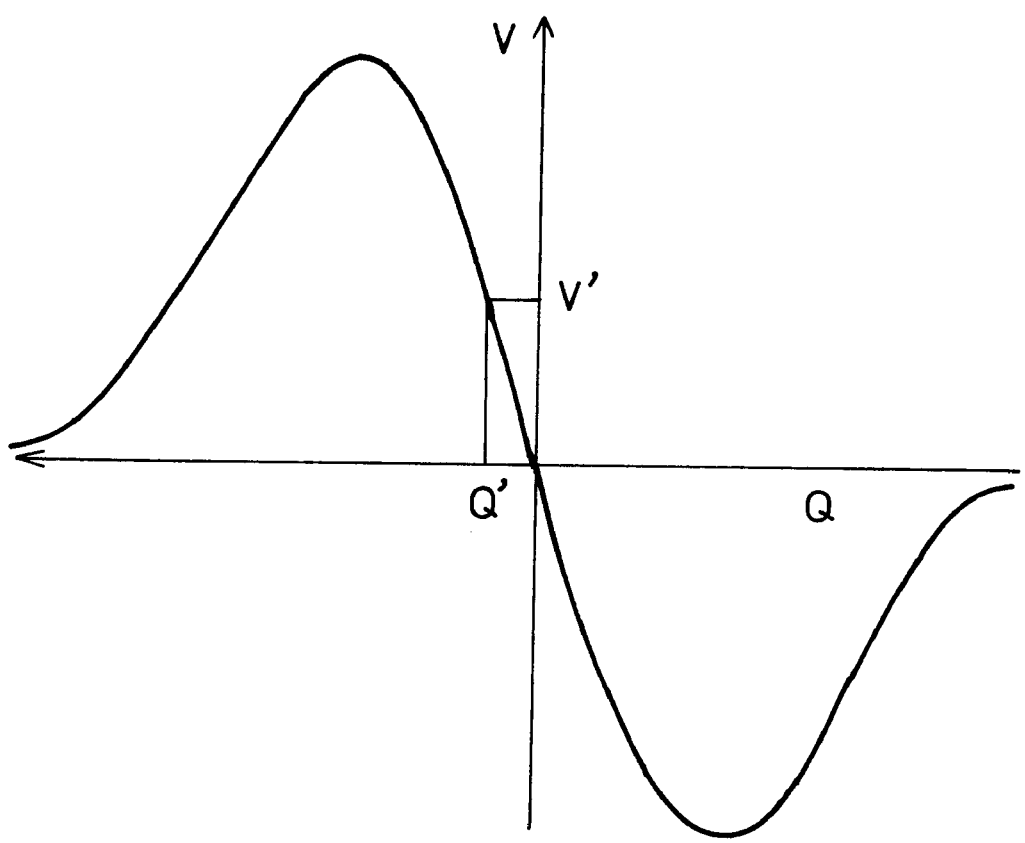
FIG. 8 is a graph showing the relationship between the output of the light receiving element and the lens distance.

Therefore, when the calculation $$V=(A+D)-(B+C)$$

wherein A, B, C and D are the outputs from the light receiving surfaces 8a to 8d, respectively, is performed, a curve indicating the relationship between the result V of the calculation and the lens distance Q shown in FIG. 8 is obtained. This calculation is performed by the CPU 22. Therefore, the control device 21 controls the lens distance so as to maintain the result V of the calculation for an optimum value according to the above curve. For instance, in the graph shown in FIG. 8, if control is performed to maintain the result of the calculation at V', it is possible to maintain the lens distance at Q'.

A method of detecting the degree of convergence or divergence of the above light has already been known as the astigmatic aberration detection method, and the optical pickup device of this embodiment employs this method.

As described above, in the method of detecting the lens distance with the use of the reflected light from the second lens 12, since the radius of curvature varies sensitively to a variation in the lens distance, a highly accurate detection of the lens distance can be achieved.

Moreover, since the detection system for the lens distance is separated from the objective lens unit 5, it does not affect the focusing operation and the tracking operation of the objective lens unit 5.

Furthermore, since there is no need to lead a long conductor out of the objective lens unit 5, it is possible to perform a detection up to a high band.

Besides, the distance between the first lens 11 and the recording medium 9 is maintained uniform by the focusing operation of the objective lens unit 5. It is thus possible to control the distance between the second lens 12 and the recording medium 9, i.e., the work distance WD, to an optimum value without affecting the focusing operation. Consequently, even if there are a thickness error in the cover glass 9b of the recording medium 9 and variations in the thickness of the objective lens unit 5, it is possible to cancel the occurrence of spherical aberration by cancelling out the above-mentioned spherical aberrations SA1 and SA2. In other words, the work distance WD needs to be maintained for an optimum value according to the thickness error in the cover glass 9b and the variations in the thickness of the objective lens unit 5.

Additionally, it is desirable that the reflected light beam $16b_2$ emitted from the objective lens unit 5 is not parallel light but is convergent light or divergent light for the reasons described below.

From the point of view of highly accurate detection of the lens distance between the first lens 11 and the second lens 12, it is desirable that the light incident on the light receiving element 8 through the condenser lens 6 and the cylindrical lens 7 is only the reflected light beam $16b_2$ from the reflecting film 12a.

On the other hand, the light beam 16a which passes through the central part of the second lens 12 falls on the objective lens unit 5 again after being reflected by the information recording layer 9a of the recording medium 9, passes through the second lens 12 and the first lens 11 in this order, and is then emitted as a parallel light beam from the objective lens unit 5. This light will be hereinafter referred to as the reflected light beam $16a_2$.

Figure 9:
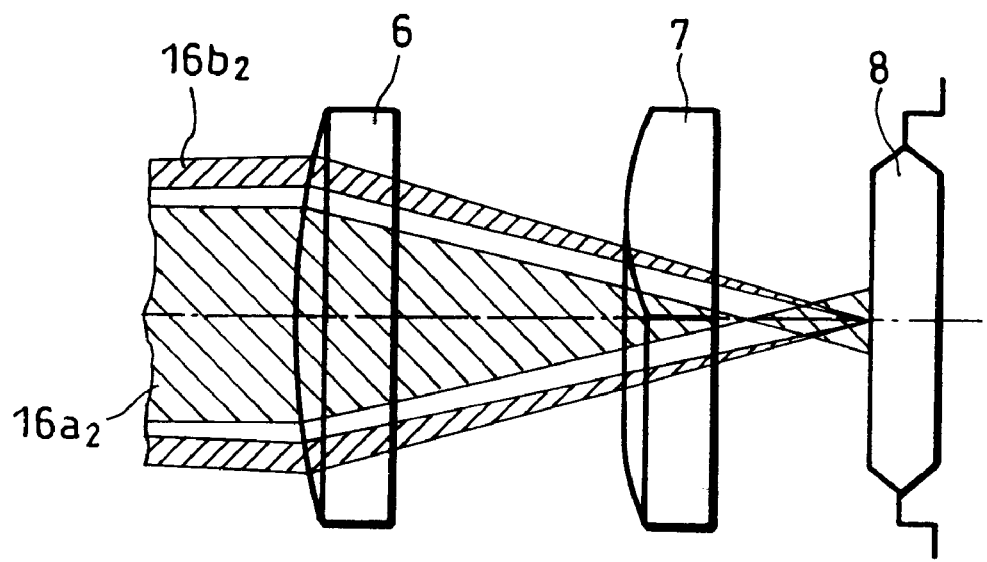
FIG. 9 is an explanatory view showing the relationship between the focal point of the reflected light beam when the reflected light beam from the reflecting film of the second lens is divergent and the focal point of a reflected light beam from the information recording layer of the recording medium in the state shown in FIG. 5(a).

As shown in FIG. 9, when this reflected light beam $16a_2$ passes through the polarizing beam splitter 3, part of the reflected light beam $16a_2$ also falls on the light receiving element 8 after passing through the condenser lens 6 and the cylindrical lens 7. The reflected light beam $16a_2$ from the information recording layer 9a, i.e., parallel light, causes disturbance in detecting the reflected light beam $16b_2$ from the reflecting film 12a. Hence, it is desirable to eliminate the effect of the reflected light beam $16a_2$ from the information recording layer 9a.

Therefore, the objective lens unit 5 is set so that the reflected light beam $16b_2$ from the reflecting film 12a becomes convergent light or divergent light. For this setting, an angle i of incidence at which the reflected light beam 16b falls on the reflecting film 12a of the second lens 12 needs to be other than 0 degree for the reasons mentioned below.

Considering the reflection of the light beam 16b by the reflecting film 12a of the second lens 12, if the angle i of incidence on the reflecting film 12a is 0 degree, the optical path of the incident light beam 16b and the optical path of the reflected light beam $16b_2$ completely coincide with each other. Then, the light beam $16b_2$ which was reflected by the reflecting film 12a, passed through the first lens 11 again and emitted from the objective lens unit 5 becomes parallel light like the incident light beam 16b.

Therefore, in order to make the reflected light beam $16b_2$ convergent light or divergent light, it is necessary to design the shape of a surface on which the reflecting film 12a of the second lens 12 is formed or design the lens distance between the first lens 11 and the second lens so that the angle i of incidence is not 0 degree. Moreover, if the lens distance is made out of the design value, since the height at which the light beam 16b falls on the second lens 12 varies and hence the angle i of incidence varies. Eventually, the degree of convergence or the degree of divergence of the reflected light beam $16b_2$ varies.

With such a structure of the reflecting film 12a, the position of the focal point of the reflected light beam $16b_2$ from the reflecting film 12a and the position of the focal point of the reflected light beam $16a_2$ from the information recording layer 9a differ from each other. Thus, when the light receiving element 8 is positioned on the focal point of the reflected light beam $16b_2$ from the reflecting film 12a, the reflected light beam $16a_2$ from the information recording layer 9a does not converge on the light receiving element 8. Namely, this reflected light beam $16a_2$ forms a beam spot which spreads entirely on the light receiving surfaces 8a to 8d of the light receiving element 8, and the effect of the reflected light beam $16a_2$ can be ignored.

Next, the following description will explain a desirable range of the radius of curvature of the wave front of the reflected light beam $16b_2$ from the reflecting film 12 immediately after being emitted from the objective lens unit 5.

The difference x between the focal point of the reflected light beam $16b_2$ from the reflecting film 12a and the focal point of the reflected light beam $16a_2$ from the information recording layer 9a is given by $$x=f^2/(r+s) \quad (6)$$

wherein r is the radius of curvature of the wave front of the reflected light beam $16b_2$, f is the focal length of the condenser lens 6, and s is the distance between the objective lens unit 5 and the condenser lens 6.

In general, if the range of separation of the two focal points, i.e., the absolute value of x, is set no less than 10 μm, the reflected light beam $16a_2$ from the information recording layer 9a does not converge on the light receiving element 8, and light which is spread entirely forms a beam spot and the effect of this light can be ignored.

Besides, since the focal length f of the condenser lens 6 is around 30 mm, it is desirable that the absolute value of r+s is not more than 90000 mm. In particular, when the absolute value of the radius r of curvature is large, the absolute value of the radius r of curvature needs to be no more than 90000 mm because r+s≈r.

On the other hand, if the absolute value of the radius r of curvature is small, a variation in the distance s due to the focusing operation causes a problem. More specifically, a displacement of the objective lens unit 5 in the optical axis direction causes disturbance and an error in the result of the detection.

In general, since the displacement due to the focusing operation, i.e., the range of variation of the above distance s needs to be around ±1 mm, it is desirable that the absolute value of the radius r of curvature is not less than 100 mm in order to make the detection accuracy of the radius r of curvature within ±1%. Eventually, as the range of the radius r of curvature, the absolute value thereof is more preferably no less than 100 mm, but no more than 90000 mm.

Incidentally, the detection system formed by the condenser lens 6, the cylindrical lens 7 and the light receiving element 8 employs a so-called astigmatic aberration detection method. However, it is not necessarily to limit the detection system to this method, and the Foucault method using a knife edge may be employed.

Embodiment 2

Figure 10:
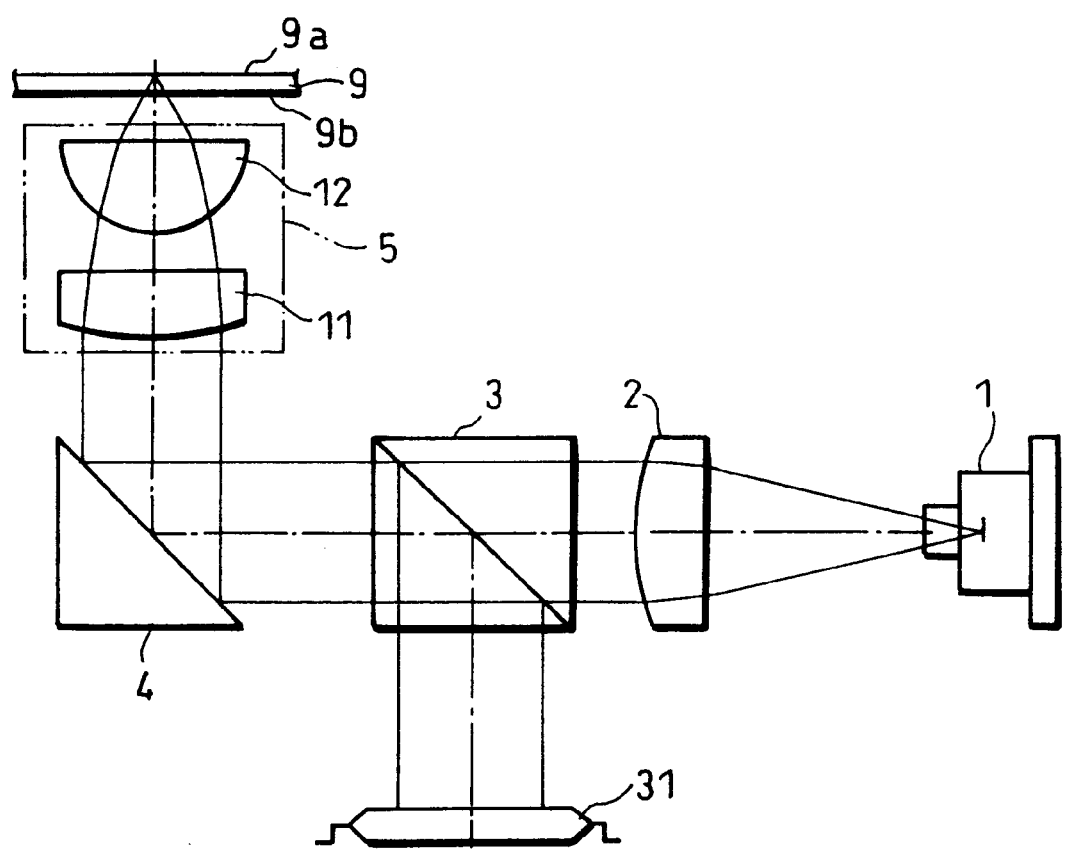
FIG. 10 shows schematically an entire structure of an optical pickup device according to another embodiment of the present invention.
Figure 11:
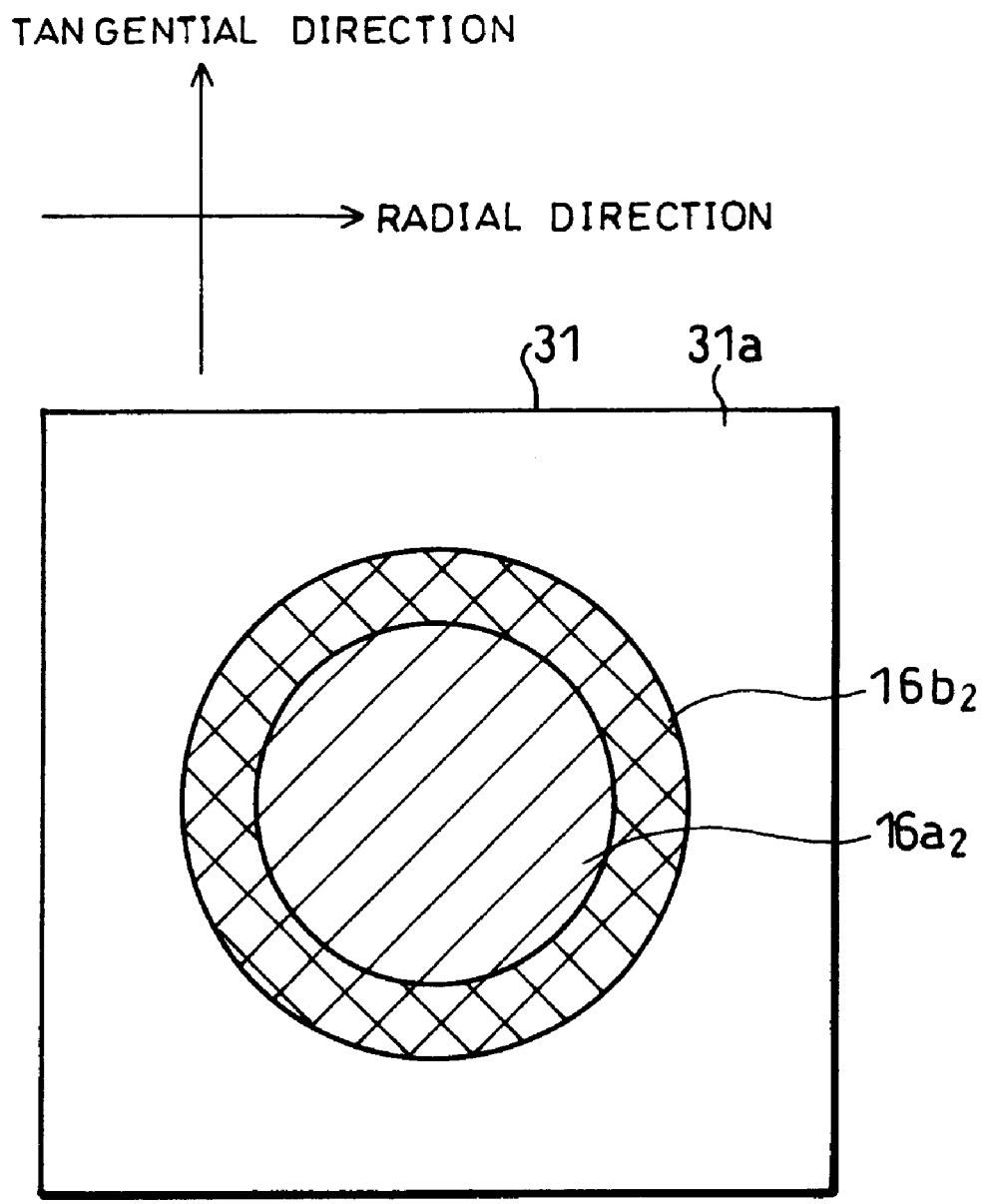
FIG. 11 is a front view showing a detection state of the reflected light beam from the reflecting film of the second lens by the light receiving element shown in FIG. 10.
Figure 13:
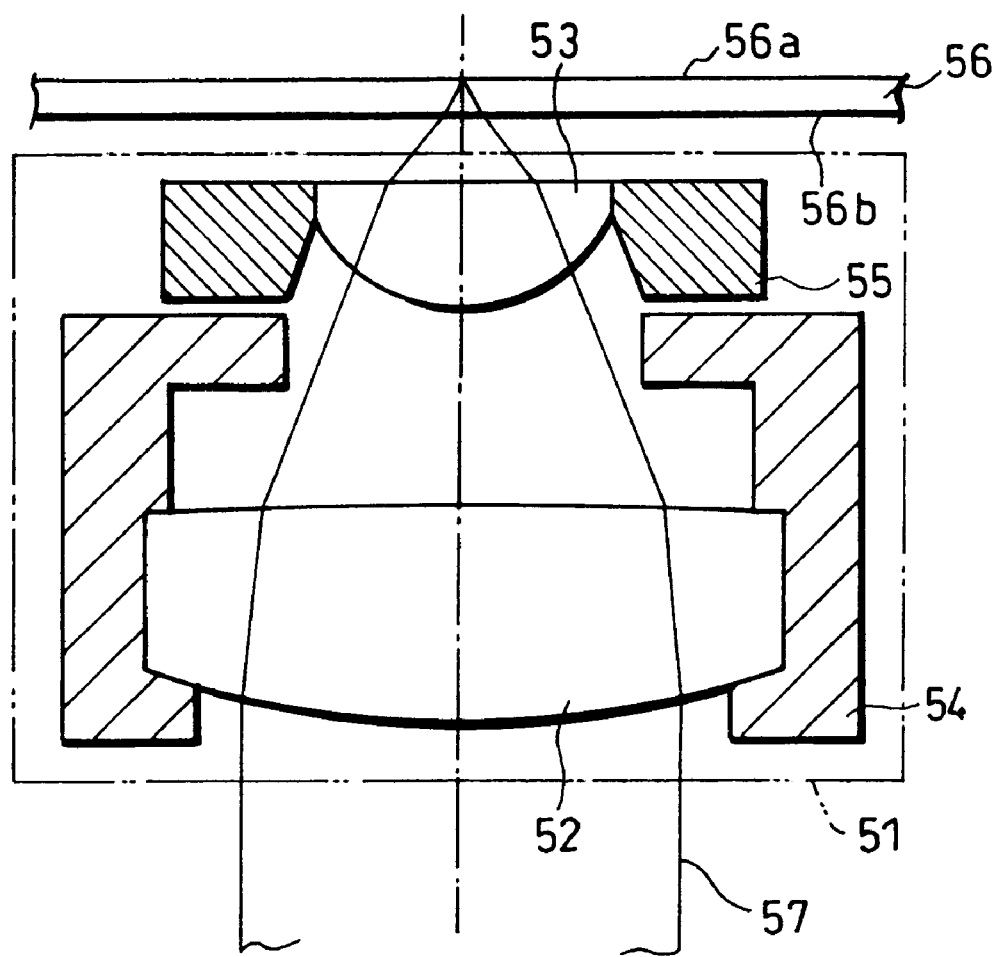
FIG. 13 is a cross sectional view showing a conventional objective lens unit.

The following description will explain another embodiment of the present invention with reference to FIG. 10 and FIG. 11. For the sake of explanation, the means having the same functions as those in the above-mentioned embodiment will be designated by the same codes and the explanation thereof will be omitted.

As illustrated in FIG. 10, an optical pickup device of this embodiment includes a light receiving element 31 in place of the condenser lens 6, cylindrical lens 7 and light receiving element 8 shown in FIG. 1. This light receiving element 31 receives a light beam emitted from the objective lens unit 5 to detect the outer diameter of the light beam.

The light receiving element 31 includes a light receiving surface 31a shown in FIG. 11. A beam spot of the reflected light beam $16b_2$ from the reflecting film 12a is formed in the shape of a ring on the light receiving surface 31a. Moreover, a beam spot of the reflected light beam $16a_2$ from the information recording layer 9a is formed inside of the beam spot of the reflected light beam $16b_2$.

With this structure, when the lens distance between the first lens 11 and the second lens 12 varies, the outer diameter of the beam spot on the light receiving surface 31a varies. Thus, by measuring the outer diameter of this beam spot, it is possible to detect the lens distance. Moreover, if the control device 21 controls the second-lens-driving-use actuator 15 so that the detected outer diameter of the beam spot becomes a predetermined value, the lens distance can be maintained for an optimum value.

Here, in the measurement of the outer diameter of the beam spot, since the beam spot of the reflected light beam $16a_2$ from the information recording layer 9a is present inside of the beam spot of the reflected light beam $16b_2$ from the reflecting film 12a, it does not affect the value of the outer diameter of the beam spot to be measured. Therefore, in the optical pickup device of this embodiment, it is possible to control the lens distance with a simple thin structure excluding the condenser lens 6 and the cylindrical lens 7.

Besides, when the objective lens unit 5 performs the tracking operation, the beam spots of the reflected light beam $16a_2$ and $16b_2$ projected on the light receiving element 31 are displaced in a radial direction (in a direction in which the beam spot is displaced when tracking the recording medium 9, for example, an optical disk). Thus, it is necessary to determine the size of the light receiving surface 31a so that both of the beam spots do not come out of the light receiving surface 31a due to the tracking operation and detection of the outer diameter of the beam spot is feasible.

Embodiment 3

The following description will explain still another embodiment of the present invention with reference to FIG. 10 and FIG. 12.

An optical pickup device of this embodiment has the structure shown in FIG. 10 except that it includes a light receiving element 32 shown in FIG. 12 in place of the light receiving element 31. Like the light receiving element 31, the light receiving element 32 receives a light beam emitted from the objective lens unit 5 to detect the outer diameter of the light beam. The light receiving element 32 is formed by a one-dimensional element arranged in a radial direction of the recording medium 9 (for example, an optical disk), and has a long and narrow light receiving surface 32a extended in a radial direction.

With the tracking operation of the objective lens unit 5, the beam spots of the reflected light beams $16a_2$ and $16b_2$ to be projected on the light receiving element 32 are displaced in a radial direction (a direction in which the beam spot is displaced when tracking is performed with respect to the recording medium 9) but is not displaced in a tangential direction which crosses the radial direction at right angles. Therefore, even when such a light receiving element 32 is used, it is possible to detect the outer diameter of the beam spot.

With this structure, it is possible to fabricate the optical pickup at lower costs compared with the light receiving element 31 using a two-dimensional element. Incidentally, it is necessary to set the length of the light receiving element 32 so that the beam spots do not come out of the light receiving surface 32a due to the tracking operation.

Additionally, in general, the objective lens unit incorporates a diaphragm for limiting the numerical aperture. Whereas in the optical pickup devices of the above-described embodiments, the reflecting film 12a of the second lens 12 can also perform the function of the diaphragm. Thus, it is not necessary to provide the diaphragm additionally.

Moreover, in the above-described embodiments, the objective lens unit 5 is composed of two pieces of lenses. However, it is not necessarily to limit the objective lens unit 5 to such a structure. Namely, the objective lens unit 5 may be composed of more than two pieces of lenses.

Furthermore, in the above-described embodiments, the reflecting film 12a is provided on the hemispherical surface of the second lens 12, i.e., on a surface opposite to a surface facing the recording medium 9. However, it is not necessarily to limit the reflecting film 12a to such a structure. Namely, the reflecting film 12a may be formed on the surface of the second lens 12, facing the recording medium 9. In addition, when the second lens 12 is composed of a plurality of lenses, it is necessary to provide the reflecting film 12a on one of these lenses.

As described above, in the optical pickup device of the present invention, the reflected light beam detecting means focuses the reflected light beam by converging the reflected light beam, and the control means may be designed to detect the position of the focal point of the reflected light beam and control the lens distance adjusting means according to the position of the focal point.

With this structure, it is possible to achieve the reflected light beam detecting means by, for example, a condenser lens and a cylindrical lens, and achieve the structure of the control means for detecting the position of the focal point of the reflected light beam by a light receiving element having a plurality of light receiving surfaces and means for calculating the position of the focal point of the reflected light beam from the outputs of the light receiving element. In other words, it is possible to detect the distance between the first lens and second lens of the objective lens unit with a simple structure.

Besides, the above optical pickup device may be constructed so that the light reflected by the reflecting section of the second lens and emitted from the objective lens unit is non-parallel light.

According to this structure, when detecting the reflected light beam from the reflecting section of the second lens by the reflected light beam detecting means, this reflected light beam is in a state where the reflected light beam is combined with a reflected light beam which passed through the second lens and was reflected by the recording medium. Therefore, if the reflected light beam from the reflecting section of the second lens is non-parallel light, the position of the focal point of this reflected light beam is different from the position of the focal point of the reflected light beam of the parallel light from the recording medium. It is thus possible to facilitate the detection of the reflected light beam from the reflecting section by the reflected light detecting means. As a result, the accuracy for detecting the distance between the first lens and the second lens can be further improved.

In the above optical pickup device, the range of radius of curvature of the wave front of the non-parallel light is preferably set so that the absolute value thereof is not less than 100 mm but not more than 90000 mm. When the radius of curvature is within this range, the non-parallel light can be easily separated from the reflected light from the recording medium.

The above optical pickup device may be constructed so that the reflected light beam detecting means includes a light receiving element for detecting the reflected light beam and that the control means detects the diameter of the reflected light beam according to the output signals of the light receiving means and controls the lens distance adjusting means according to the diameter of the reflected light beam.

According to this structure, the structure of the reflected light beam detecting means can be simplified, and the distance between the first lens and the second lens can be easily detected.

The above optical pickup device may be constructed so that the light receiving element is formed by a one-dimensional element arranged in a radial direction of the recording medium.

According to this structure, the light receiving element for detecting the diameter of the reflected light beam may be achieved by a one-dimensional element arranged in a radial direction of the recording medium, for example, an optical disk. With this structure, it is possible to further simplify the structure of the reflected light beam detecting means.

The above optical pickup device may be constructed so that the reflecting section is achieved by a reflecting film formed in the shape of a ring on a surface of the second lens.

According to this structure, it is possible to easily form the reflecting film by, for example, vapor deposition of a metal film.

The above optical pickup may be constructed so that the reflecting film functions as a diaphragm of the objective lens unit.

According to this structure, there is no need to additionally provide a diaphragm as a separate member in the objective lens unit. It is thus possible to achieve the objective lens unit with a simple and low-cost structure.

The invention being thus described, it will be obvious that the same may be varied in many ways. Such variation are not to be regarded as a departure from the spirit and scope of the invention, and all such modification as would be obvious to one skilled in the art are intended to be included within the scope of the following claims.

What is claimed is:

1. An optical pickup device comprising:
   an objective lens unit including a first lens, a second lens for converging a light beam which passed through said first lens on a recording surface of a recording medium, and lens distance adjusting means for adjusting a distance between said first lens and said second lens, wherein said second lens has a reflecting section for reflecting an outer part of the light beam which passed through said first lens and reached said second lens;
   reflected light beam detecting means for detecting a reflected light beam reflected by said reflecting section of said second lens; and
   control means for detecting the distance between said first lens and said second lens according to a result of detection by said reflected light beam detecting means and for controlling said lens distance adjusting means according to the result of detection.

2. An optical pickup device as set forth in claim 1,
   wherein incident light on said objective lens unit is parallel light, said first lens guides the incident parallel light to said second lens, said second lens is formed by a hemispherical lens and positioned with its curved surface facing said first lens, and said reflecting section is formed on the curved surface.

3. An optical pickup device as set forth in claim 1,
   wherein said reflected light beam detecting means focuses the reflected light beam by converging the reflected light beam, and
   said control means detects a position of a focal point of the reflected light beam and controls said lens distance adjusting means according to the position of the focal point.

4. An optical pickup device as set forth in claim 3,
   wherein the light which was reflected by said reflecting section of said second lens and emitted from said objective lens unit is non-parallel light.

5. An optical pickup device as set forth in claim 4,
   wherein a range of radius of curvature of a wave front of the non-parallel light is set so that an absolute value thereof is not less than 100 mm but not more than 90000 mm.

6. An optical pickup device as set forth in claim 2,
   wherein in order to make the light, which is to be reflected by said reflecting section of said second lens and emitted from said objective lens unit, non-parallel light, said reflecting section is formed so that an angle of incidence on said reflecting section is not 0 degree.

7. An optical pickup device as set forth in claim 1,
   wherein said reflecting section is made of a reflecting film formed in a ring shape on a surface of said second lens.

8. An optical pickup device as set forth in claim 7,
   wherein said reflecting film functions as a diaphragm of said objective lens unit.

9. An optical pickup device as set forth in claim 7,
   wherein said reflecting film is made of a film formed by vapor deposition.

10. An optical pickup device as set forth in claim 1,
    wherein said reflected light beam detecting means includes a light receiving element for detecting the reflected light beam, and
    said control means detects a diameter of the reflected light beam according to output signals of said light receiving element, and controls said lens distance adjusting means according to the diameter of the reflected light beam.

11. An optical pickup device as set forth in claim 10,
    wherein said reflected light beam detecting means causes incident light on said light receiving element to fall on said light receiving element without converging the light.

12. An optical pickup device as set forth in claim 10,
    wherein said light receiving element is a one-dimensional element arranged in a radial direction of said recording medium.

13. An optical pickup device as set forth in claim 1,
    wherein said control means detects the distance between said first lens and said second lens by an astigmatic aberration detection method.

* * * * *